(12) United States Patent
Chalmers et al.

(10) Patent No.: US 9,276,889 B2
(45) Date of Patent: Mar. 1, 2016

(54) USING DISTANCE FROM A FORUM POSTING AS CRITERIA TO SELECTIVELY CONVEY EMAIL NOTIFICATIONS OR NOT

(71) Applicant: INTERNATIONAL BUSINESS MACHINES CORPORATION, Armonk, NY (US)

(72) Inventors: Diane C. Chalmers, Rochester, MN (US); Nixon Cheaz, Cary, NC (US); David M. Stecher, Durham, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 254 days.

(21) Appl. No.: 13/892,791

(22) Filed: May 13, 2013

(65) Prior Publication Data

US 2014/0337443 A1    Nov. 13, 2014

(51) Int. Cl.
G06F 15/16    (2006.01)
H04L 12/58    (2006.01)

(52) U.S. Cl.
CPC ................................ *H04L 51/24* (2013.01)

(58) Field of Classification Search
CPC .................................................... H04L 12/58
USPC ................................. 709/204–207, 217–219
See application file for complete search history.

(56) References Cited

U.S. PATENT DOCUMENTS

| | | | | |
|---|---|---|---|---|
| 7,747,705 | B1 * | 6/2010 | Raja | 709/219 |
| 2007/0271129 | A1 * | 11/2007 | Dutton et al. | 705/8 |
| 2008/0021962 | A1 * | 1/2008 | Ryan et al. | 709/206 |
| 2011/0161987 | A1 * | 6/2011 | Huang et al. | 719/318 |
| 2014/0172996 | A1 * | 6/2014 | Deeter et al. | 709/206 |

FOREIGN PATENT DOCUMENTS

WO    2012099617    7/2012

* cited by examiner

*Primary Examiner* — Liangche A Wang
*Assistant Examiner* — Kaylee Huang
(74) *Attorney, Agent, or Firm* — Patent on Demand P.A.; Brian K. Buchheit; Scott M. Garrett

(57) ABSTRACT

A collaboration server determines a response to a posting on a communication forum. The collaboration server determines whether or not to convey an email notification to a posting user via email based upon a distance threshold established for email notifications. The distance threshold is an integer value. The collaboration server calculates a current distance between the response and the posting, where the current distance represents a quantity of responses to the posting from forum participants that have occurred without a new response from the posting user being submitted to the communication forum. Responsive to the current distance being less than the distance threshold, an email is conveyed to an email account of the posting user informing the posting user of the response. Otherwise, no email is conveyed.

10 Claims, 2 Drawing Sheets

USING DISTANCE FROM A FORUM POSTING AS CRITERIA TO SELECTIVELY CONVEY EMAIL NOTIFICATIONS OR NOT

BACKGROUND

The present invention relates to the field of communication forums and email notifications sent for postings to communication forums.

Many communication forums exist where users can submit posts, view posts from others, and respond to posts from others. These communication forums are often managed by a collaboration server. The communication forums may be accessible via a Web browser accessing a Web site served by the collaboration server or may be accessible through a client-side application interface linked to the collaboration server. The collaboration server can be a chat server, a workflow management system server, a project management server, a software configuration management server, an intranet server, and the like.

Regardless of the specific nature of the collaboration server, one feature of the collaboration server may include email notifications, which are generated by postings and/or responses to postings submitted to the communication forum. System users may receive overwhelming volumes of these notifications, which decreases their effectiveness.

For example, an IBM Rational Team Concert® server is a collaboration server (specifically a software configuration management server, for permitting a team to collaborate on work items). Using the server, one or more colleagues can provide a comment or description for a specific work item, where each work item is often a software defect or issue to be resolved by a collaborating team. These comments or descriptions on work items may be considered (for purposes of this disclosure) posts to the communication forum. IBM Rational Team Concert® permits a "mail configuration", which sends an email notification to a user based on notification generating actions linked to the communication forum. For example, an email notification can be sent when new comments are added to a work item, when a summary or description of a work item is changed, when a severity, priority, or planned for attribute of a work item is changed, when an owner of a work items is changed, when a subscriber is added or removed to a work item, and the like. It is not unusual for some developers to receive fifty email notifications a day from an IBM Rational Team Concert® server. Business developers, receiving fifty email messages from the collaboration server, often ignore these messages or give them a decreased urgency, which results in these developers not being timely informed about important items.

DETAILED DESCRIPTION

Figure 1:
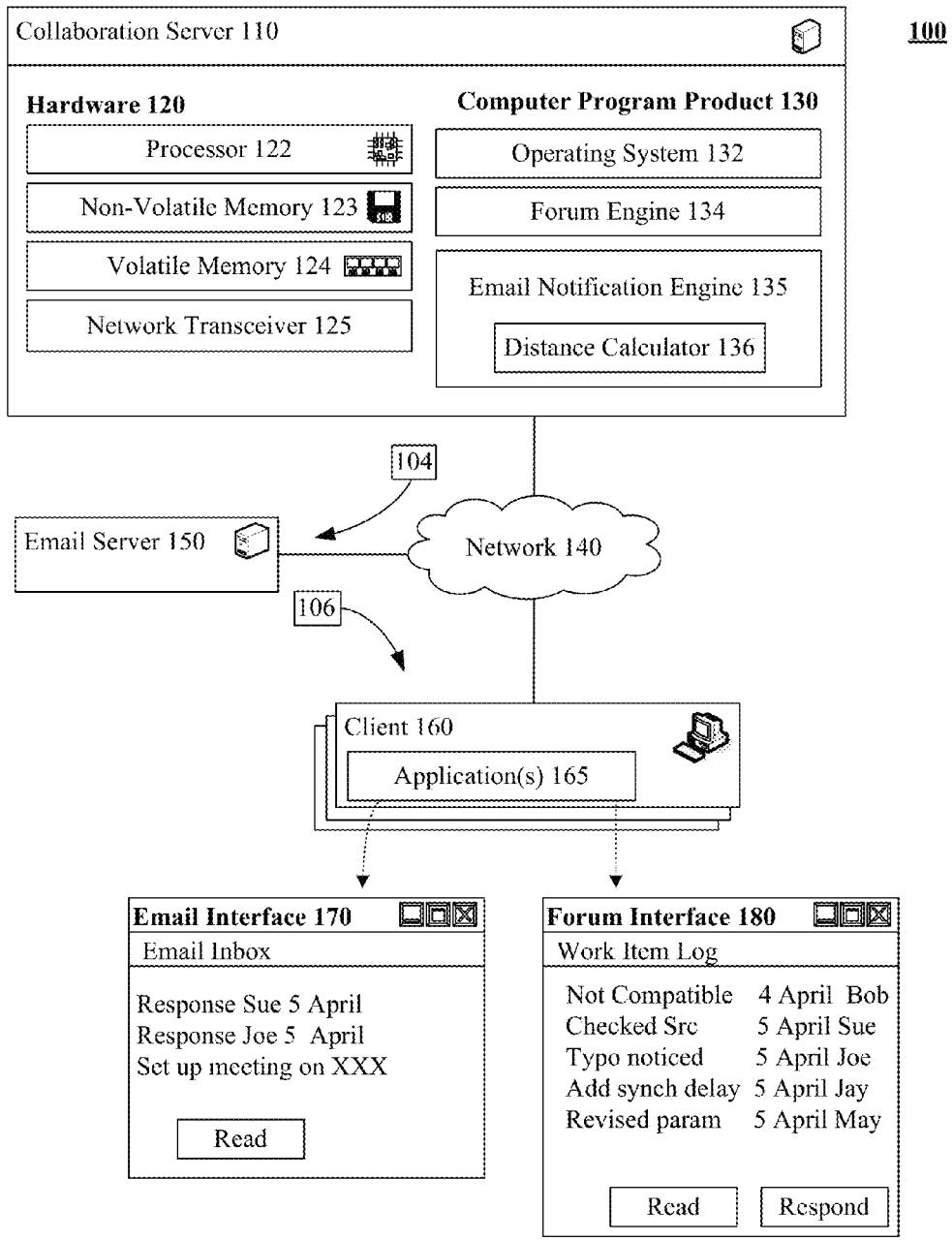
FIG. 1 depicts a system showing a collaboration server utilizing a distance from a posting to determine whether or not to convey email notifications, in accordance with embodiments of the disclosure.

Embodiments of the present invention permit email notifications to be selectively sent to a poster depending on a distance of a new forum posting to a user's forum posting. The distance refers to a number of posts to the communication forum since a given user last submitted a particular posting. Postings can be for a common discussion thread or can be directed to a common work item, task, and the like. A distance threshold can be manually established by a user or may be an average distance algorithmically computed using historic information.

For example, assuming the communication forum is for a software configuration management (SCM) system, and assuming that a set of postings are postings for specific work items, use of the distance factor for email notifications can strike a balance between ensuring users are notified of important events while minimizing notification overload. In a SCM system, as volumes of comments to a work item increases (which increases the distance of the comments from an original user's posting) the benefit of sending email notifications to the original user decreases. For example, the original user has likely received a significant number of email notifications for the posting, which alerts the user that there is a work item that should be given attention. This original user will log onto the SCM system and access the work item in question. Thus, additional email notifications for posting that occur after the distance threshold has been reached are generally extraneous and provide diminishing extra incentive to the user receiving email notifications. Instead, it is increasingly likely that these additional email notifications will overwhelm the user—receiving less user attention than desired as a result. Additionally, as volumes of comments back and forth occur in the communication forum without the posting user's participation, it becomes increasing likely that the posts relating to the work item does not pertain to the user. Thus, the email notifications are of diminishing value as the posts are of diminishing import to the user receiving the email notifications.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction processing system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction processing system, apparatus, or device.

Program code embodied on a computer readable medium may be transmitted using any appropriate medium, including but not limited to wireless, wire line, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Turning to the figures, FIG. 1 depicts a system 100 showing a collaboration server 110 utilizing a distance from a posting to determine whether or not to convey email notifications, in accordance with embodiments of the disclosure. The distance refers to a quantity of posts to a communication forum since a given user last submitted a particular posting.

In system 100, a set of client 160 computing devices, an email server 150, and a collaboration server 110 are communicatively linked via network 140. The client(s) 160 run a set of applications 165, which provide user interfaces for user-to-machine interactions. The applications 165 can include client-side applications specifically designed to interact with collaboration server 110 and/or email server 150. Thus, one of the applications 165 can be a client-side collaboration application and another can be a client-side email application. In one embodiment, the application(s) 165 can also include a Web browser. The Web browser renders Web pages and Web content. Accordingly, client 160 can interface with a Web site for the email server or with a Web site for the collaboration server 110 in contemplated embodiments.

Applications 165 can provide graphical user interface (GUIs), speech user interfaces (SUIs), and other user-to-machine interfaces that permit users to interact with servers 110 and 150. Email interface 170 represents a user interface for interacting with email server 150. Forum interface 180 represents a user interface for interacting with collaboration server 110.

Users can submit one or more posts for a communication forum provided by collaboration server 110. The forum engine 134 can handle back-end functions for the communication forum. Posts to the communication forum can be messages associated with specific users, and they can appear to a set of forum participants accessing the collaboration server 110. Posts can be replied to by other forum participants. As shown by forum interface 180, an illustrative post is submitted by Bob, which has four responsive posts by Sue, Joe, Jay, and May, respectively.

An email notification engine 135 can include functions to selective inform a posting user (i.e., Bob in the example) when responses are posted to the communication forum. A distance calculator 136 can calculate a distance to a posting. For example, assuming the responses of Sue, Joe, Jay and May are in sequential order, the distance calculator 136 can determine distances of "one" for Sue's response, "two" for Joe's response, "three" for Jay's response, and "four" for May's response, respectively.

In one embodiment, if Bob were to respond to his own posting within the communication forum, then the distance to the posting is reset. Thus, if after May's response, Bob responded within the communicating forum, a subsequent response by Sue would have a distance of one, since it is the first response after Bob's most recent posting.

The email notification engine 135 can compare a distance of a response against a distance threshold. The distance threshold may be manually established by the poster (i.e., Bob), may be configured for a group of users, may be configured as a default value able to be changed by an authorized administrator, may be an algorithmically calculated value computed based on historical information, and the like.

An example of an algorithmically calculated distance threshold can be an average distance between a particular user's comments before another originator response is received. For instance, Bob may on average have three posts to the communication forum before responding. Thus, the distance threshold can be set to three.

When the email notification engine 135 of the collaboration server 110 indicates an email notification is to be sent, an email message 104 to this effect can be generated by the collaboration server 110 and submitted to an email server 150. The email server 150 can convey the email message 104 the posting user.

Assuming a distance threshold of three is established (and using the previously discussed example) and assuming that email notifications are only sent when the distance calculated by the distance calculator is less than the threshold, two notifications (for the first two postings) can be sent to the original poster (i.e., Bob). Thus, Bob's email interface 170 will show email messages generated by the collaboration server 110 for Sue's response and for Joe's response. Responses from Jay and May (which have distances of 3 and 4) being conveyed to Bob will not result in email notifications.

In one embodiment, multiple different criteria can be used by the email notification engine 135, wherein the distance versus threshold is only one of the conditions. For example, a white/black list can be established so that no notifications are sent for responses from people on a "black list." If Sue is on a "black list" even though her response has a distance of "one", no notification of the response is conveyed via email to Bob. In one embodiment, the distance calculator 136 may only "count" post responses that resulted in an email notification. Thus, if Sue's posting is "skipped" for any reason, distance calculations for responses of Joe, Jay and May can be calculated as "one", "two", and "three" respectively.

Continuing the example, if May is on a "white list" even though her response has a distance of "four" calculated by the email notification engine 135, which is greater than the distance threshold of "three", an email notification is nevertheless sent to Bob for this response. Accordingly, it should be appreciated that although for the sake of simplicity the only criteria/factor for determining email notifications is the distance, other criteria and conditions are contemplated. Distance may be one factor in an arbitrarily complex decision made by engine 135.

As used herein, network 140 can include any hardware/software/and firmware necessary to convey data encoded within carrier waves. Data can be contained within analog or digital signals and conveyed though data or voice channels. Network 140 can include local components and data pathways necessary for communications to be exchanged among computing device components and between integrated device components and peripheral devices. Network 140 can also include network equipment, such as routers, data lines, hubs, and intermediary servers which together form a data network, such as the Internet. Network 140 can also include circuit-based communication components and mobile communication components, such as telephony switches, modems, cellular communication towers, and the like. Network 140 can include line based and/or wireless communication pathways.

Collaboration server 110, email server 150, and client 160 can each be a set of one or more machines. These machines can include one or more processors, internal bus structures, transceivers, power supplies, memory storage spaces, input/output components, ports, and the like. Collaboration server 110 is specifically shown as including hardware 120 of processor 122, nonvolatile memory 123, volatile memory 124, and network transceiver 125. Each of the machines may also include computer program products, which include programmatic instructions that are stored in memory and able to be executed by the processor(s) of the machines. The collaboration server 110 shows computer program products 130 including an operating system 132, a forum engine 134, and an email notification engine 135. Collaboration server 110 and email server 150 can each represent a single computer, a set of computers, or a collaboration of distributed computers interoperating to perform collaboration or email services. Java 2 Enterprise Edition™ application servers are an example of a distributed set of machines functioning as a server for purposes of the disclosure. The client 160 can include a personal computer, a notebook computer, a kiosk, a mobile phone, a tablet computing device, an embedded computing device, and other such devices. Client 160 may be a consumer electronic device that provides email interface 170 and/or forum interface 180 for user-to-machine interactions.

The machines presented herein can include embedded data stores as well as ports to interact with external data stores. Data stores can be storage mediums or memories. Data stores may be non-transitory storage mediums capable of persisting digitally stored information (as opposed to being transitory mediums like carrier waves). As such, data stores include physical as well as virtual storage spaces configured to store digital information. Data stores can be physically implemented within any type of hardware including, but not limited to, a magnetic disk, an optical disk, a semiconductor memory, a digitally encoded plastic memory, a holographic memory, or any other recording medium. Data stores can be a stand-alone storage unit as well as a storage unit formed from a plurality of physical devices. Additionally, information can be stored within data stores in a variety of manners. For example, information can be stored within a database structure or can be stored within one or more files of a file storage system, where each file may or may not be indexed for information searching purposes. Further, data stores can utilize one or more encryption mechanisms to protect stored information from unauthorized access.

Email server 150 can be a set of one or more computers communicatively linked to network 140 for sending, receiving, and/or managing email messages. Email server 150 can include a storage area where e-mail is stored for local users, a set of user definable rules which determine how the mail server should react to the destination of a specific message, a database of user accounts that the email server recognizes and will deal with locally, and communications modules which are the components that actually handle the transfer of messages to and from other email servers and email clients. Email server 150 may include an outgoing email server as well as an incoming email server. The outgoing email server may conform to Simple Mail Transfer Protocol (SMTP). The incoming email server may conform to Post Office Protocol (version 3 for example) (POP3) or Internet Message Access Protocol (ISAP). Email server 150 may or may not provide a Web based client for browser based access to managed email. Other protocols are contemplated for email server 150 and are to be considered within scope of the disclosure.

The collaboration server 110 provides a communication forum. The communication forum may be a chat forum, internet forum, a message board, an intranet forum, a task management forum, a workflow forum, a project forum, a social networking forum, and the like. The communication forum permits messages to be posted and read. The communication forum can maintain multiple different "conversations" or threads. Communication forums can be moderated or mod-erated as well as private or public.

The forum engine 134 can include program instructions providing functions for maintaining a communication forum. The forum engine 134 can be a functional back-end for a front-end that includes forum interface 180. Email notification engine 135 is able to at least send email messages. The notification engine 135 may state that email messages are from the collaboration server 110. The email notification engine 135 can utilize email server 150 for email communications, and therefore effectively be a client interface to an emailing system. In one embodiment, the email notification engine 135 can receive and process email messages directed towards it. Email notification engine 135 uses distance calculator to determine a current distance a posting of the communication forum has from a target posting.

Figure 2:
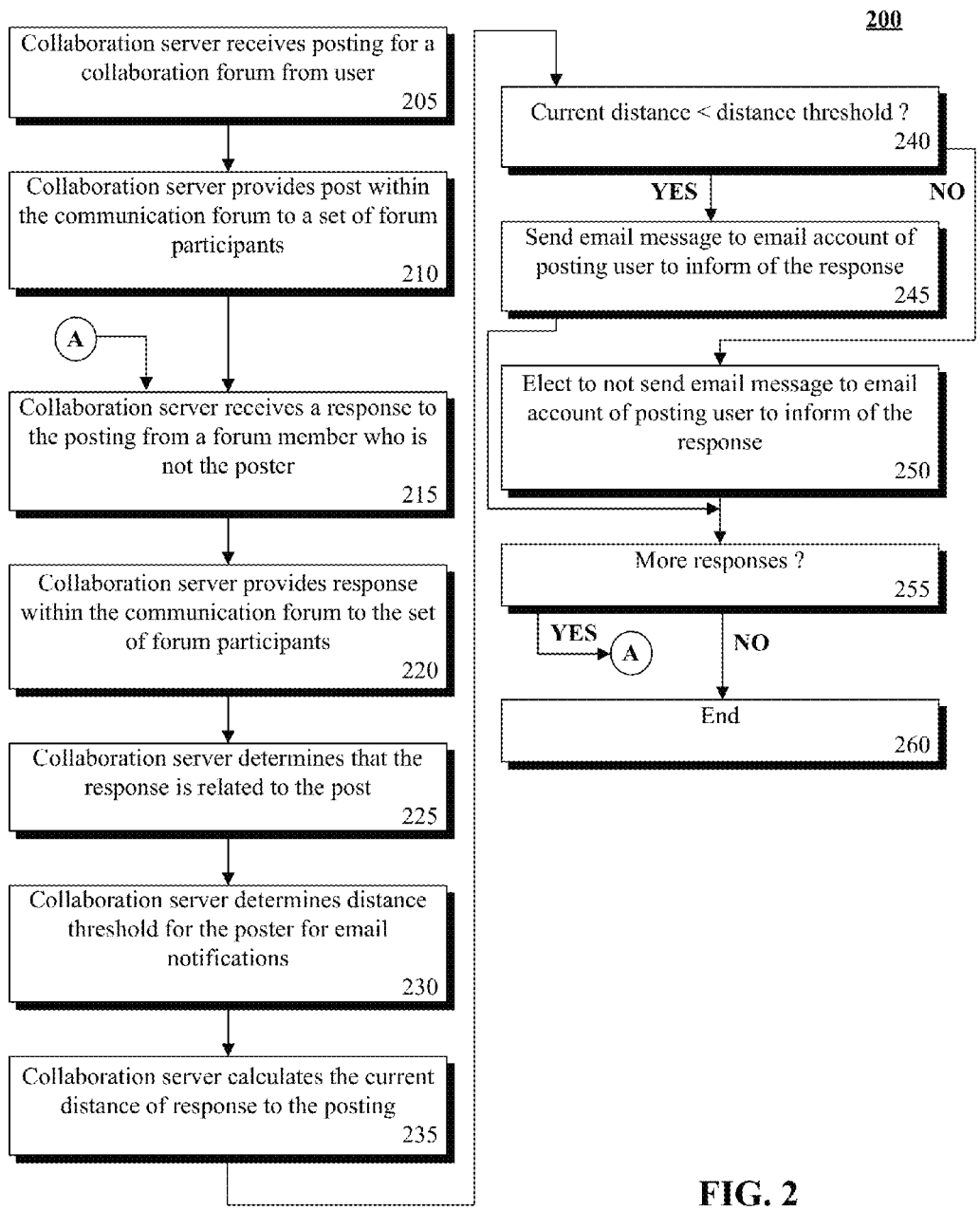
FIG. 2 shows a flow chart for utilizing distance from a communication forum post to manage email notifications, in accordance of embodiments of the disclosure.

FIG. 2 shows a flow chart 200 for utilizing distance from a communication forum post to manage email notifications in accordance of embodiments of the disclosure. The flow chart 200 can begin in step 205, where a collaboration server receives a posting for a communication forum from a user. This user can be considered a poster or a posting user. The posting can represent a message posted to a chat forum, a change posted for a work item of a work flow system, a task posted in a task management system, a project note posted in a project management system, a message posted on a BLOG, a message posted to an intranet (having a communication forum), and the like. In step 210, the collaboration server can provide the post within the communication forum to a set of forum participants. The communication forum may be associated with a Web site (with pages served by the collaboration server) in one embodiment. The communication forum may be a back-end forum accessible via user interfaces of a set of front-end client applications.

In step 215, the collaboration server receives a response to the posting from a forum member, who is not the posting user. In step 220, the collaboration server provides (presents, displays, or otherwise makes available) the response within the communication forum to the set of forum participants. Thus, forum participants are able to access the communication forum and see both the original post and the response.

In step 225, the collaboration server can determine that the response is related to the post. Upon this determination, the collaboration server can determine a distance threshold for the poster for receiving email notifications, as shown by step 230. Different users able to make posts may have user unique distance thresholds. The distance threshold (compared to a current distance) can be an exclusive criteria/factor used by the collaboration server or can be one of many criteria/factors used depending on implementation specifics. In step 235, the collaboration server can calculate a current distance of the response to the posting. In one embodiment, the current distance is a value of a number of posting made to the communication forum since the posting without an intervening posting from the user. In one embodiment, only postings that resulted in email notifications being sent to the posting user may count towards the current distance (so if additional factors prevented an email notification being sent, the distance would not be increased, as the user was not informed of the posting via an email notification). In another embodiment, the current distance is incremented per subsequent posting regardless of whether an email notification is sent to the posting user.

In step 240, if the current distance is less than the distance threshold, an email notification for the responsive posting can be sent to an email account of the posting user, as shown by step 245. The simple conditional statement of step 240 is illustrative—more complex conditional statements that include current distance being compared to the distance threshold are contemplated in embodiments of the disclosure. If the current distance is greater than or equal to the distance threshold, no email notification is sent to the posting user, as shown by step 250. Additional responses can be checked for in step 255. The collaboration server can post additional responses, calculate a distance threshold, and determine whether to send an email notification, as shown by the flowchart 200 branching from step 255 to step 215. If no new messages/responses exists, the process can end in step 260.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be processed substantially concurrently, or the blocks may sometimes be processed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
   determining, via a collaboration server, comprising one or more processors executing programmatic instructions stored in a memory, a response to a posting on a communication forum, wherein the communication forum provides a Web site through which a set of forum participants are able to view posts and the Web site provides responses to posts that have been submitted to the communication forum; and
   determining, via the collaboration server, whether or not to convey an email notification of the response to the posting to a posting user via email based upon a distance threshold established for email notifications, wherein the distance threshold is an integer value, wherein the determining of whether or not to convey an email notification comprises:
     computing, via the collaboration server, an average distance between historically submitted posts from the posting user and a quantity of responses from others before the posting user submits a new related post to the communication forum;
     setting, via the collaboration server, the average distance as the distance threshold;
   calculating, via the collaboration server, a current distance between the response and the posting, wherein the current distance represents a quantity of responses to the posting from forum participants that have occurred without a new response from the posting user being submitted to the communication forum; and
   responsive to the current distance being less than the distance threshold, conveying, via the collaboration server, an email to an email account of the posting user informing the posting user of the response, wherein if the current distance is greater than or equal to the distance threshold, the collaboration server does not convey an email to the email account of the posting user.

2. The method of claim 1, wherein the collaboration server is a software configuration management (SCM) server, wherein the post is for an artifact managed by the software configuration management server, wherein the set of forum participants are a group of people responsible for maintaining the artifact.

3. The method of claim 1, wherein the email is conveyed from an email server, which is distinct from and remotely located from the collaboration server.

4. The method of claim 1, wherein a new posting from the posting user in a communication thread related to the posting resets the current distance to zero.

5. A method for minimizing email notifications resulting from responses to communication forum postings comprising:
- receiving, via a collaboration server comprising hardware and software running on the hardware, a post to a communication forum from a posting user;
- providing, via the collaboration server, the post within the communication forum to a set of forum participants, which includes at least the posting user, a first responder, and a second responder;
- receiving, via the collaboration server, a first response to the post from the first responder;
- providing, via the collaboration server, the first response within the communication forum to the set of forum participants;
- determining, via the collaboration server, that the first response is related to the post, which is an email notification generating event;
- detecting, via the collaboration server, that the posting user has previously established an email notification action having a distance threshold, wherein said distance threshold is an integer value;
- computing, via the collaboration server, an average distance between historically submitted posts from the posting user and a quantity of responses from others before the posting user submits a new related post to the communication forum;
- setting, via the collaboration server, the average distance as the distance threshold;
- calculating, via the collaboration server, a first quantity of postings submitted responsive to the post, wherein the first response is one such responsive posting that adds a value of one when calculating the first quantity;
- determining, via the collaboration server, the first quantity is less than the distance threshold and responsively conveying an email to an email account of the posting user informing the posting user of the first response;
- receiving, via the collaboration server, a second response to the post from the second responder;
- providing, via the collaboration server, the second response within the communication forum to the set of forum participants;
- determining, via the collaboration server, that the second response is related to the post, which is an email notification generating event;
- detecting, via the collaboration server, that the posting user has previously established the email notification action having the distance threshold;
- calculating, via the collaboration server, a second quantity postings submitted responsive to the post, wherein the first response and the second response are each responsive posts that together adds a value of two when calculating the second quantity; and
- determining, via the collaboration server, the second quantity is equal to or greater than the distance threshold and the collaboration server not conveying an email to the email account of the posting user so that the posting user is not informed via of the second response via an email notification from the collaboration server.

6. The method of claim 5, wherein the collaboration server is a software configuration management (SCM) server, wherein the post is for an artifact managed by the software configuration management server, wherein the set of forum participants are a group of people responsible for maintaining the artifact.

7. The method of claim 5, wherein the email is conveyed from an email server, which is distinct from and remotely located from the collaboration server.

8. A method for minimizing email notifications resulting from responses to communication forum postings comprising:
- receiving, via a collaboration server comprising hardware and software running on the hardware, a post to a communication forum from a posting user;
- providing, via the collaboration server, the post within the communication forum to a set of forum participants, which includes at least the posting user, a first responder, and a second responder;
- receiving, via the collaboration server, a first response to the post from the first responder;
- providing, via the collaboration server, the first response within the communication forum to the set of forum participants;
- determining, via the collaboration server, that the first response is related to the post, which is an email notification generating event;
- detecting, via the collaboration server, that the posting user has previously established an email notification action having a distance threshold, wherein said distance threshold is an integer value;
- computing, via the collaboration server, an average distance between historically submitted posts from the posting user and a quantity of responses from others before the posting user submits a new related post to the communication forum;
- setting, via the collaboration server, the average distance as the distance threshold;
- calculating, via the collaboration server, a first quantity of email notifications received by the posting user for the post;
- determining, via the collaboration server, the first quantity is less than the distance threshold and responsively conveying an email to an email account of the posting user informing the posting user of the first response;
- receiving, via the collaboration server, a second response to the post from the second responder;
- providing, via the collaboration server, the second response within the communication forum to the set of forum participants;
- determining, via the collaboration server, that the second response is related to the post, which is an email notification generating event;
- detecting, via the collaboration server, that the posting user has previously established the email notification action having the distance threshold;
- calculating, via the collaboration server, a second quantity of email notifications received by the posting user for the post;
- determining, via the collaboration server, the second quantity is equal to or greater than the distance threshold and the collaboration server not conveying an email to the email account of the posting user so that the posting user is not informed via of the second response via an email notification from the collaboration server.

9. The method of claim 8, wherein the collaboration server is a software configuration management (SCM) server, wherein the post is for an artifact managed by the software configuration management server, wherein the set of forum participants are a group of people responsible for maintaining the artifact.

10. The method of claim 8, wherein the email is conveyed from an email server, which is distinct from and remotely located from the collaboration server.

* * * * *